(12) United States Patent
Shi et al.

(10) Patent No.: US 12,112,507 B1
(45) Date of Patent: Oct. 8, 2024

(54) METHOD AND DEVICE FOR FAST FOCUSING BY DIRECTLY DETECTING TARGET MOMENTS

(71) Applicant: Hefei Institutes of Physical Science, Chinese Academy of Sciences, Hefei (CN)

(72) Inventors: Dongfeng Shi, Hefei (CN); Yingjian Wang, Hefei (CN); Yafeng Chen, Hefei (CN); Jian Huang, Hefei (CN); Huiling Chen, Hefei (CN)

(73) Assignee: Hefei Institutes of Physical Science, Chinese Academy of Sciences, Hefei (CN)

( * ) Notice: Subject to any disclaimer, the term of this patent is extended or adjusted under 35 U.S.C. 154(b) by 0 days.

(21) Appl. No.: 18/658,189

(22) Filed: May 8, 2024

Related U.S. Application Data (63) Continuation of application No. PCT/CN2024/082856, filed on Mar. 21, 2024.

(30) Foreign Application Priority Data

Jan. 22, 2024 (CN) .......................... 202410087873.4

(51) Int. Cl.
*G06T 7/80* (2017.01)
*G06T 7/60* (2017.01)
(Continued)

(52) U.S. Cl.
CPC .................. *G06T 7/80* (2017.01); *G06T 7/60* (2013.01); *G06T 7/70* (2017.01); *H04N 23/67* (2023.01)

(58) Field of Classification Search
None
See application file for complete search history.

(56) References Cited

U.S. PATENT DOCUMENTS

2023/0063939 A1 3/2023 Xie et al.
2023/0239053 A1 7/2023 Xia et al.

FOREIGN PATENT DOCUMENTS

CN 107424155 A 12/2017
CN 110012196 A 7/2019
(Continued)

OTHER PUBLICATIONS

Chen et al., Research on high-speed total focusing ultrasonic imaging method based on Omega-K algorithm, Chinese Journal of Scientific Instrument, 2018, 39(9), pp. 128-134, dated Sep. 15, 2018.

(Continued)

*Primary Examiner* — James M Hannett
(74) *Attorney, Agent, or Firm* — Westbridge IP LLC (57) ABSTRACT

Provided are a method and a device for fast focusing by directly detecting target moments. The method includes: generating a setting modulation matrix and loading the modulation matrix to an optical modulator, receiving an optical signal emitted or transmitted by a target object at a current focusing position, and modulating, by the modulation matrix, the optical signal; acquiring a geometric moment value of the target object at the current focusing position according to the modulated optical signal; calculating a central moment; and a focusing position, obtained by refocusing, serving as the current focusing position, returning the optical signal of the target object that is received at the current focusing position and emitted or transmitted by the target object, comparing the central moment corresponding to the target object at all the focusing positions, and determining the focusing position that corresponds to the minimum central moment as the focusing position.

10 Claims, 3 Drawing Sheets

(51) Int. Cl.
    G06T 7/70      (2017.01)
    H04N 23/67     (2023.01)

(56) References Cited

FOREIGN PATENT DOCUMENTS

| CN | 113296258 A   | 8/2021  |
|----|---------------|---------|
| EP | 2831657 A2    | 2/2015  |
| WO | 2015110363 A1 | 7/2015  |
| WO | 2017174710 A1 | 10/2017 |

OTHER PUBLICATIONS

Lv et al., Three-dimensional imaging method of lidar based on sparse sampling technique, Chinese Journal of Quantum Electronics, 2018, 35(1), pp. 95-101, dated Jan. 15, 2018.
Notification to Grant Patent Right for Invention issued in counterpart Chinese Patent Application No. 202410087873.4, dated Mar. 4, 2024.
Zha et al., Improving the Accuracy of Single-Pixel Tracking a Small-Sized Moving Object Using Defocus Blur, IEEE Journal of Selected Topics in Quantum Electronics, 2023, 29(6), pp. 1-8, dated Dec. 31, 2023.

METHOD AND DEVICE FOR FAST FOCUSING BY DIRECTLY DETECTING TARGET MOMENTS

CROSS-REFERENCE TO RELATED APPLICATION

The application is a continuation of International Application No. PCT/CN2024/082856, filed on Mar. 21, 2024, which claims priority to Chinese Patent Application No. 202410087873.4, filed on Jan. 22, 2024. All of the aforementioned applications are incorporated herein by reference in their entireties.

TECHNICAL FIELD

The present disclosure belongs to the technical field of single-pixel imaging, and in particular a method and a device for fast focusing by directly detecting target moments.

BACKGROUND

With the rapid development of computer vision and image processing technologies, the demand for high-quality images has been increasing in recent years. Quickly and accurately focusing to obtain clear images are crucial in many fields such as medical imaging, industrial inspection and security monitoring. However, implementing fast focusing remains challenging in some cases due to limitations of an optical system and an imaging device as well as other factors.

Traditional automatic focusing methods are usually based on focusing indexes of an image collecting device, such as an image sharpness evaluation function. These methods can determine the best focusing position by analyzing specific features in the image or using pixel-level focusing information. In addition, the traditional methods usually need to consume a large amount of time and computational resources for image analysis and processing, thus reducing the real-time focusing ability.

SUMMARY

To implement the fast focusing, the present disclosure provides a method and a device for fast focusing by directly detecting target moments, with the specific technical solution as follows.

A method for rapid focusing by directly detecting target moments includes:
generating a setting modulation matrix and loading the modulation matrix to an optical modulator, receiving an optical signal emitted or transmitted by a target object at a current focusing position, and modulating, by the modulation matrix, the optical signal;
acquiring a geometric moment value of the target object at the current focusing position according to the modulated optical signal;
calculating a central moment, that corresponds to the target object at the current focusing position, according to the geometric moment value; and
a focusing position, obtained by refocusing, serving as the current focusing position, returning the optical signal of the target object that is received at the current focusing position and emitted or transmitted by the target object until the central moment corresponding to the target object at all focusing positions is obtained, comparing the central moment corresponding to the target object at all the focusing positions, and determining the focusing position that corresponds to the minimum central moment as the focusing position.

In one implementation plan, the acquiring the geometric moment value of the target object at the current focusing position according to the modulated optical signal includes:
using a single-pixel detector to acquire the geometric moment value of the target object at the current focusing position according to the modulated optical signal.

In one implementation plan, the acquiring the geometric moment value of the target object at the current focusing position according to the modulated optical signal includes:
determining a two-dimensional function $S_i(x,y)$ that corresponds to the i modulation matrix; and
modulating the optical signal according to the two-dimensional function $S_i(x,y)$ to obtain an optical information intensity value $I_i$ corresponding to i, which is equivalent to the geometric moment value corresponding to i.

In one implementation plan, the setting modulation matrix includes:
a modulation matrix M1, which is a two-dimensional matrix, and an element value of each position therein is 1;
a modulation matrix M2, which is a two-dimensional matrix, and an element value of each line therein is equal to a line sequence number thereof; and
a modulation matrix M3, which is a two-dimensional matrix, and an element value of each line therein is equal to the square of the line sequence number thereof.

In one implementation plan, the determining the two-dimensional function $S_i(x,y)$ that corresponds to the i modulation matrix includes:
determining the two-dimensional functions $S_1(x,y)$, $S_2(x,y)$ and $S_3(x,y)$ that correspond to the modulation matrices M1, M2 and M3, and separately meeting:

$$S_1(x,y)=1$$

$$S_2(x,y)=x$$

$$S_3(x,y)=x^2$$

an abscissa and an ordinate of a coordinate system where the two-dimensional functions $S_1(x,y)$, $S_2(x,y)$ and $S_3(x,y)$ are located correspond to row directions and column directions of the modulation matrices M1, M2 and M3, respectively;
the modulating the optical signal according to the two-dimensional function $S_1(x,y)$ to obtain the optical information intensity value $I_i$ corresponding to i, which is equivalent to the geometric moment value corresponding to i includes:
the corresponding optical information intensity value $I_i$ that is acquired by modulating the optical signal based on the two-dimensional functions $S_1(x,y)$, $S_2(x,y)$ and $S_3(x,y)$ is denoted as:

$$I_i = \Sigma_{x,y} f(x,y) S_i(x,y);$$

in the formula, i value is 1, 2, 3, and $f(x,y)$ is a two-dimensional distribution function of a target object image at the current focusing position; and
the detected optical intensity values $I_1$, $I_2$ and $I_3$ are equivalent to geometric moment values m00, m10 and m20, respectively.

A device for rapid focusing by directly detecting target moments, including:

a modulation module, which is configured to generate a setting modulation matrix and to receive an optical signal emitted or transmitted by a target object at different focusing positions, and the modulation matrix modulates the optical signal;

a geometric moment value acquisition module, which is configured to acquire a geometric moment value of the target object at the different focusing positions according to the detected and modulated optical signal;

a central moment value acquisition module, which is configured to receive the geometric moment value output by the geometric moment value acquisition module and to calculate a central moment corresponding to the target object at the different focusing positions; and a focusing position determination module, which is configured to compare the central moment corresponding to the target object at all the focusing positions, and the focusing position that corresponds to the minimum central moment is determined as the focusing position.

In one implementation plan, the modulation module includes a two-dimensional matrix generation unit and an optical modulator, the two-dimensional matrix generation unit generates a plurality of modulation matrices, and the optical modulator uses different modulation matrices sequentially and periodically to modulate the optical signal.

In one implementation plan, the optical modulator includes a plurality of micro-mirrors presenting an array distribution, and each element value in the modulation matrices corresponds to an unique micro-mirror.

A computer readable storage medium, where the medium stores a computer program, and while the computer program runs, the above method for rapid focusing by directly detecting target moments is implemented.

A computer device, including a processor and a storage medium, where the storage medium stores a computer program, and the processor reads and runs the computer program from the storage medium to execute the above method for rapid focusing by directly detecting target moments.

The method for rapid focusing by directly detecting target moments has many beneficial effects in the field of image collection and analysis, including some following important aspects.

Firstly, high-speed and accurate focusing: the traditional automatic focusing method is difficult to achieve fast and accurate focusing due to the interference of noise, light change, motion blur and other factors. While the method for rapid focusing by directly detecting target moments performs efficient evaluation on image features in a short time by combining the single-pixel imaging and moment calculation method, thus achieving a fast and accurate focusing process.

Secondly, reduction of cost and complexity: the traditional image collection device usually adopts a pixel array, which requires a lot of pixels to capture the image information, thus increasing the cost and complexity. In comparison, the optical intensity information of the image may be acquired by only one single-pixel detector, and other hardware devices are not required, thus reducing the requirement and cost of the imaging device. A more portable and more flexible focusing device may be produced through this simplified design, which provides greater convenience for various applications.

Thirdly, strong robustness and adaptation: the moment detection and fast focusing technology for the single-pixel still has good performances under conditions of poor illumination and existence of a complex background. Since the moment is used for direct detection to perform the image quality evaluation; and by this technology, a plurality of features and the change rate of the image can be considered comprehensively, and accurate focusing indexes can be provided. Thus, the high-quality and high-efficiency focusing can be achieved by the technology in a low-illumination environment, the complex background and other challenging scenarios.

Lastly, real-time focusing ability: due to the adoption of efficient and optimized moment calculation methods, the moment detection and rapid focusing technology can meet the requirements of real-time focusing. Whether the real-time monitoring, autonomous driving or virtual/augmented reality and other fields, the demands for acquiring, analyzing and processing image data in time can be met through this technology, thus improving the response speed and real-time performance of the system.

To sum up, the moment detection and fast focusing technology for the single pixel has many beneficial effects in the field of image collection and analysis. In combination with the single-pixel imaging and moment detection algorithm, the high-speed and accurate focusing process can be achieved by the technology, and the cost and complexity are reduced. With the features of strong robustness and adaptation, the technology can show good performances in various illumination conditions and scenarios. In addition, this technology processes the real-time focusing ability, to meet the demands for real-time monitoring and imaging collection. More importantly, the moment detection and fast focusing technology for the single pixel has important application prospects in widely used fields such as medical imaging, industrial detection and security monitoring, and brings many opportunities and innovations to the development and progress of these fields.

BRIEF DESCRIPTION OF THE DRAWINGS

To better clarify the embodiment of the present disclosure or the technical solution in the prior art, the drawings required to illustrate the embodiments or the prior art will be simply described below. It is apparent that the drawings described below are some embodiments in the present disclosure. Those ordinarily skilled in the art can obtain other drawings according to these drawings without contributing creative labor on the basis of those drawings.

DETAILED DESCRIPTION OF THE EMBODIMENTS

The traditional automatic focusing method can determine the best focusing position by analyzing specific features in the image or using pixel-level focusing information, and the traditional focusing requires long-time focusing and a great number of calculations for image analyzing and processing, therefore the traditional focusing method has low timeliness.

A moment detection algorithm is a high-efficiency image quality evaluation method, and the image sharpness and focusing quality are determined by analyzing the moment change rate of the image. The algorithm can evaluate the image sharpness by calculating the central moment feature of the image, and provide focusing indexes. Compared with the traditional focusing method, the moment detection algorithm has better robustness and quick performance, so as to quickly and accurately evaluate the focusing quality of the image in complex scenarios.

Figure 1:
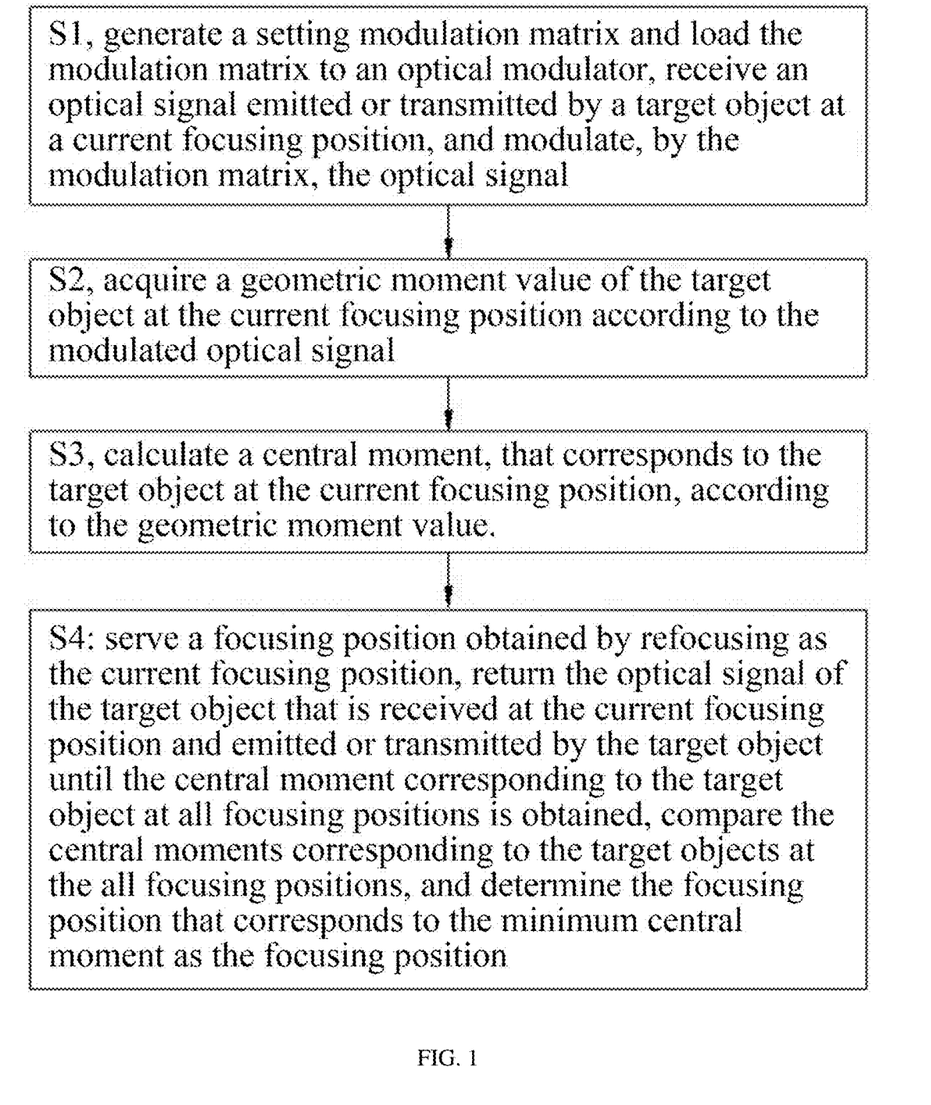
FIG. 1 shows a flowchart for fast focusing with single-pixel moment detection in embodiments according to the present disclosure.

According to the above analysis, to achieve the quick determination for the best focusing position, as shown in FIG. 1, this application discloses a method for fast focusing by directly detecting target moments, including:

S1, generating a setting modulation matrix and loading the modulation matrix to an optical modulator, receiving an optical signal emitted or transmitted by a target object at a current focusing position, and modulating, by the modulation matrix, the optical signal;

S2, acquiring a geometric moment value of the target object at the current focusing position according to the modulated optical signal;

S3, calculating a central moment, that corresponds to the target object at the current focusing position, according to the geometric moment value; and S4, a focusing position, obtained by refocusing, serving as the current focusing position, returning the optical signal of the target object that is received at the current focusing position and emitted or transmitted by the target object until the central moment corresponding to the target object at all focusing positions is obtained, comparing the central moment corresponding to the target object at all the focusing positions, and determining the focusing position that corresponds to the minimum central moment as the focusing position.

In one embodiment, to determine the best focusing position more accurately, a plurality of features and the change rate of the target image are considered comprehensively in a process that the target object is focused and imaged to the target image, and in this solution, the modulation matrix set in S1 includes:

a modulation matrix $M_1$, which is a two-dimensional matrix, and an element value of each position therein is 1;

a modulation matrix $M_2$, which is a two-dimensional matrix, and an element value of each line therein is equal to a line sequence number thereof; and a modulation matrix $M_3$, which is a two-dimensional matrix, and an element value of each line therein is equal to the square of the line sequence number thereof.

In S1, the element value of each position in the two-dimensional matrix $M_1$ is 1. The element value of each line in the two-dimensional matrix $M_2$ equal to a line sequence number thereof means that the element value of the first line in the matrix is all 1, the element value of the second line is all 2, the element value of the third line is all 3, and so on. The element value of the first line in the two-dimensional matrix $M_3$ is all 1, the element value of the second line is all 4, the element value of the third line is all 9, and so on. A total of three modulation matrices are used to modulate the optical signal. The optical modulator includes a plurality of micro-mirrors presenting an array distribution, each element value in the modulation matrices corresponds to an unique micro-mirror, and each micro-mirror can rotate back and forth between a positive angle and a negative angle, to correspond to the states of "0" and "1" of the optical modulator. The micro-mirror corresponding to the element value is set as a clockwise angle, whereas when the element value in the second row and third column is "0", the micro-mirror is set to a counterclockwise angle.

Specifically speaking, the geometric moment value of the target object at the current focusing position is acquired in S2 according to the modulated optical signal. In the image analysis and recognition, the moment is a very important feature, and as the simplest and the most important moment in a moment function, the geometric moment is a common technology to deduce, translate, stretch and rotate indefinite quantities. The method for obtaining the geometric moment values of a target object includes the delta method, the Green's theorem method, methods based on polygons and triangles, and methods based on image transformations.

The single-pixel imaging technology is an advanced computational imaging method, which uses the optical modulation principles and the advanced computational algorithm to acquire the image information. Different from the traditional pixel array camera, the single-pixel imaging technology uses an optical detection unit to collect the optical intensity data in the image. The technology has the features of strong adaptation, low cost, good robustness and the like, so the requirement on the optical system as well as the complexity and cost of the imaging device may be reduced through this technology.

In one embodiment, the acquiring the geometric moment value of the target object at the current focusing position according to the modulated optical signal includes: using the single-pixel detector to acquire the geometric moment value of the target object at the current focusing position according to the modulated optical signal. To be specific, using the single-pixel detector to acquire the modulated optical signal and collect the optical signal intensity value corresponding to the modulated optical signal, thus determining the geometric moment value of the target object at the current focusing position specifically includes:

S21, determining the two-dimensional function $S_i(x,y)$ corresponding to the i modulation matrix, and in this embodiment, determining the two-dimensional functions $S_1(x,y), S_2(x,y)$ and $S_3(x,y)$ that correspond to the modulation matrices $M_1$, $M_2$ and $M_3$, and separately meeting $$S_1(x,y)=1$$

$$S_2(x,y)=x$$

$$S_3(x,y)=x^2$$

an abscissa and an ordinate of a coordinate system where the two-dimensional functions $S_1(x,y), S_2(x,y)$ and $S_3(x,y)$ are located correspond to row directions and column directions of the modulation matrices $M_1$, $M_2$ and $M_3$, respectively; a two-dimensional function value corresponds to the element value of the respective modulation matrix; exemplarily, $S_1(6,2)=1$ represents that the element value of the sixth row and the second column in the two-dimensional matrix is 1, and $S_2(3,4)=3$ represents that the element value of the third row and the fourth column in the two-dimensional matrix is 3.

S22, modulating the optical signal according to the two-dimensional function $S_i(x,y)$ to obtain the corresponding optical information intensity value $I_i$, which is equivalent to the geometric moment value corresponding to i; in this solution, the optical signal is modulated according to the two-dimensional functions $S_1(x,y)$, $S_2(x,y)$ and $S_3(x,y)$ to obtain the corresponding optical information intensity value $I_i$, which is denoted as:

$$I_i = \Sigma_{x,y} f(x,y) S_i(x,y)$$

in the formula, i value is 1, 2, 3, and ƒ(x,y) is a two-dimensional distribution function of a target object image at the current focusing position.

The optical information intensity values $I_1$, $I_2$ and $I_3$ are equivalent to geometric moment values $m_{00}$, $m_{10}$ and $m_{20}$, respectively. In this application, the plurality of features and the change rate of the image are considered comprehensively by acquiring the optical information intensity values corresponding to the three different matrices, thus determining the best focusing position more accurately.

By combining the single-pixel imaging technology with the moment detection algorithm, an innovative and high-efficiency solution is provided for the fast focusing in the present disclosure. Using the optical intensity data collected by the single-pixel detector as the feature moment value directly, this technology can achieve fast focusing in a case of very low data volume. This method can not only achieve the fast focusing for the high-quality image under various illumination conditions, but also reduce the consumption of the computational resources, thus achieving the requirement of real-time focusing.

In S3, the central moment is calculated through the geometric moment values $m_{00}$, $m_{10}$, $m_{20}$, the formula is:

$$u_{20}^{(g)} = m_{20}^{(g)} - \frac{m_{10}^{(g)^2}}{m_{00}^{(g)}}$$

where (g) represents a current focusing position.

In this solution, a second-order central moment $u_{20}$ may be quickly calculated by calculating the three geometric moment values $m_{00}$, $m_{10}$ and $m_{20}$ of the target object at the current focusing position, then the image blur degree is measured, and in S4, the central moment corresponding to the target object at all the focusing positions is acquired and compared, to determine that the focusing position corresponding to the minimum central moment serves as the focusing position, that is, the purpose for fast focusing by using the direct moment detection method is achieved. Using the direct moment detection method for fast focusing may evaluate the image sharpness and focusing quality in a short time.

To sum up, the single-pixel imaging technology, that is suitable for various illumination conditions and scenarios including a low illumination environment and a complex background due to its flexibility and robustness, is used in this application. The optical intensity data collected by the single-pixel imaging technology serves as the feature moment value directly, to achieve fast focusing in a case of very low data volume. This method can not only achieve the fast focusing for the high-quality image under various illumination conditions, but also reduce the consumption of the computational resources, thus achieving the requirement of real-time focusing, and no additional hardware devices are required.

The fast focusing by directly detecting target moments technology provides an innovative solution for quick and accurate focusing in combination with the single-pixel imaging and moment detection algorithm, and the technology has a wide application prospect in the field of image collection and analysis, can meet the requirements of high-quality image acquisition and promote the development and progress in the related fields.

Figure 2:
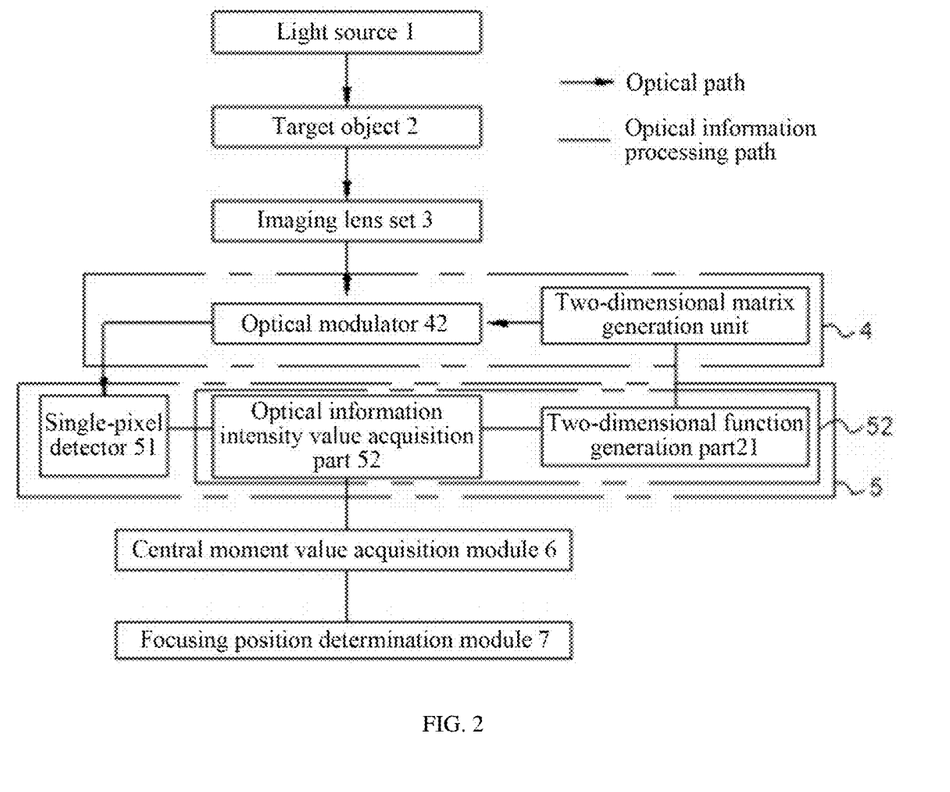
FIG. 2 shows a structure diagram of a device for fast focusing with single-pixel moment detection in embodiments according to the present disclosure.

In another embodiment, as shown in FIG. 2, this application further discloses a device for fast focusing by directly detecting target moments, including:

a modulation module 4, which is configured to generate a setting modulation matrix and to receive an optical signal emitted or transmitted by a target object 2 at different focusing positions, and the modulation matrix modulates the optical signal;

a geometric moment value acquisition module 5, which is configured to acquire a geometric moment value of the target object 2 at the different focusing positions according to the detected and modulated optical signal;

a central moment value acquisition module 6, which is configured to receive the geometric moment value output by the geometric moment value acquisition module 5 and to calculate a central moment corresponding to the target object 2 at the different focusing positions; and a focusing position determination module 7, which is configured to compare the central moments corresponding to the target object 2 at all the focusing positions, and the focusing position that corresponds to the minimum central moment is determined as the focusing position.

Figure 3:
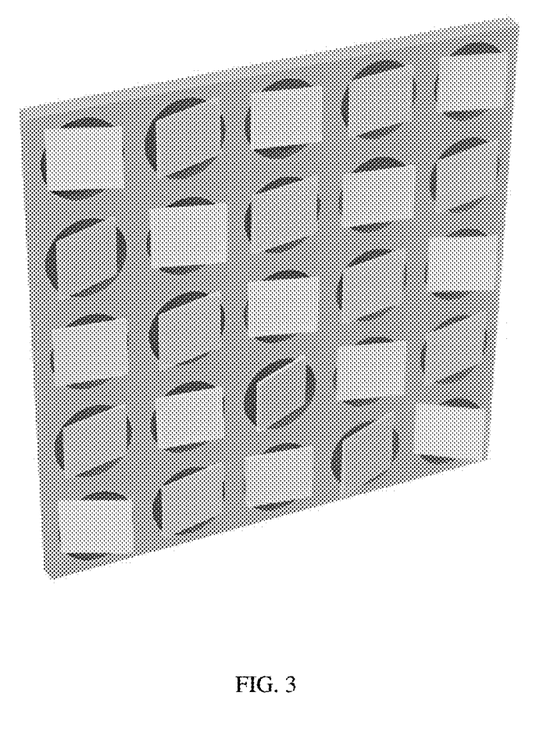
FIG. 3 is a structure diagram of an optical modulator in embodiments according to the present disclosure.

Specifically speaking, the modulation module 4 includes a two-dimensional matrix generation unit 41 and an optical modulator 42, the two-dimensional matrix generation unit 41 generates a plurality of modulation matrices, and the optical modulator 42 uses different modulation matrices sequentially and periodically to modulate the optical signal. The two-dimensional matrix generation unit 41 is used to generate the modulation matrices $M_1$, $M_2$ and $M_3$, the modulation matrix $M_1$ is a two-dimensional matrix and an element value of each position therein is 1; the modulation matrix $M_2$ is a two-dimensional matrix and an element value of each line therein is equal to a line sequence number thereof; and the modulation matrix $M_3$ is a two-dimensional matrix and an element value of each line therein is equal to the square of the line sequence number thereof. As shown in FIG. 3, the optical modulator 42 includes a plurality of micro-mirrors presenting an array distribution, and each element value in the modulation matrices corresponds to an unique micro-mirror. Each of the micro-mirrors may rotate back and forth between a positive angle and a negative angle, to correspond to the states of "0" and "1" of the optical modulator 42. Exemplarily, when the element value of the second row and the third column of the two-dimensional modulation matrix is "1", the micro-mirror corresponding to the element value is set as a clockwise angle, and however when the element value of the second row and the third column is "0", the micro-mirror is set as an anticlockwise angle. Exemplarily, the optical modulator 42 has a mode of DLP7000 and composed of 768*1024 micromirrors.

In this embodiment, the geometric moment value acquisition module 5 includes a single-pixel detector 51 and a geometric moment value solving unit 52. The single-pixel detector 51 is arranged in a direction of the modulated reflected optical of the optical modulator 42DMD, to receive the optical signal that is received from the direction the modulated reflected optical of the optical modulator 42 and modulated by the optical modulator 42. The geometric moment value solving unit 52 acquires an output signal of the single-pixel detector 51, different geometric moment values of the target object 2 at different focusing positions are calculated in combination with different modulation matrices generated by the modulation module 4, and the geometric moment value solving unit 52 includes a two-dimensional function generation part 521 and an optical information intensity value acquisition part 522 that are connected in turn.

The two-dimensional function generation part 521 is used to determine the two-dimensional functions $S_1(x,y), S_2(x,y)$ and $S_3(x,y)$ that correspond to the modulation matrices $M_1$, $M_2$ and $M_3$, and separately meeting:

$$S_1(x,y)=1$$

$$S_2(x,y)=x$$

$$S_3(x,y)=x^2$$

an abscissa and an ordinate of a coordinate system where the two-dimensional functions $S_1(x,y), S_2(x,y)$ and $S_3(x,y)$ are located correspond to row directions and column directions of the modulation matrices $M_1$, $M_2$ and $M_3$, respectively; and the two-dimensional function values correspond to the element values of the respective modulation matrices.

The optical information intensity value acquisition part 522 is used to, according to the two-dimensional function and the image two-dimensional distribution function of the target object 2, acquire the optical signal intensity values $I_1$, $I_2$ and $I_3$ that are acquired by the optical signal through the modulation matrices $M_1$, $M_2$ and $M_3$.

The central moment value acquisition module 6 acquires the central moment upon the calculation of the geometric moment values $m_{00}$, $m_{10}$ and $m_{20}$, then the image blur degree is measured, and finally the purpose of fast focusing by using the moment method is achieved in combination with the focusing position determination module 7. Using the moment direct detection algorithm for fast focusing may evaluate the image sharpness and focusing quality in a short time.

In another embodiment, the device further includes a light source 1, which is used to illuminate the target object 2; and
in another embodiment, an imaging lens set 3 is also arranged between the target object 2 and the modulation module 4, to project the optical signal reflected or transmitted by the target object 2 to the modulation module 4, and in this process, the imaging lens set 3 finally acquires the central moment corresponding to different focusing positions by changing the focusing position.

Compared with the traditional device, the device for fast focusing by directly detecting target moments has the following advantages.

High-speed performance: the geometric moment value acquisition module 5, the central moment value acquisition module 6 and the focusing position determination module 7 are adopted for fast focusing, thus evaluating the image sharpness and the focusing quality in a short time.

Accuracy: the plurality of features and the change rate of the image are considered comprehensively, thus determining the best focusing position more accurately.

Adaptation: the single-pixel imaging technology, that is used in the geometric moment value acquisition module 5, is suitable for various illumination conditions and scenarios including a low illumination environment and a complex background due to its flexibility and robustness.

Real-time performance: reducing the demands of computational resources and optimizing the algorithm may achieve the requirement of real-time focusing, meet the demand of real-time monitoring and image collection, and no additional hardware device is required.

Embodiments of the present disclosure further disclose a computer readable storage medium, where the medium stores a computer program, and while the computer program runs, the method for fast focusing by directly detecting target moments in the above embodiments is implemented.

The above are only optional embodiments of the present disclosure and not intended to limit the present disclosure. Any modifications, equivalent replacements, improvements and the like made within the spirit and principle of the present disclosure shall fall within the protection scope of the present disclosure.

What is claimed is:

1. A method for fast focusing by directly detecting target moments, comprising:
   generating a setting modulation matrix and loading the modulation matrix to an optical modulator, receiving an optical signal emitted or transmitted by a target object at a current focusing position, and modulating, by the modulation matrix, the optical signal;
   acquiring a geometric moment value of the target object at the current focusing position according to the modulated optical signal;
   calculating a central moment, that corresponds to the target object at the current focusing position, according to the geometric moment value; and
   serving a focusing position obtained by refocusing as the current focusing position, returning the optical signal of the target object that is received at the current focusing position and emitted or transmitted by the target object until the central moment corresponding to the target object at all focusing positions is obtained, comparing the central moment corresponding to the target object at all the focusing positions, and determining the focusing position that corresponds to the minimum central moment as the focusing position.

2. The method according to claim 1, wherein the acquiring the geometric moment value of the target object at the current focusing position according to the modulated optical signal comprises:
   using a single-pixel detector to acquire the geometric moment value of the target object at the current focusing position according to the modulated optical signal.

3. The method according to claim 1, wherein the acquiring the geometric moment value of the target object at the current focusing position according to the modulated optical signal comprises:
   determining a two-dimensional function $S_i(x,y)$ that corresponds to the i modulation matrix; and
   modulating the optical signal according to the two-dimensional function $S_i(x,y)$ to obtain the optical information intensity value $I_i$ corresponding to i, which is equivalent to the geometric moment value corresponding to i.

4. The method according to claim 3, wherein the setting modulation matrix comprises:
   a modulation matrix $M_1$, which is a two-dimensional matrix, and an element value of each position therein is 1;
   a modulation matrix $M_2$, which is a two-dimensional matrix, and an element value of each line therein is equal to a line sequence number thereof; and
   a modulation matrix $M_3$, which is a two-dimensional matrix, and an element value of each line therein is equal to the square of the line sequence number thereof.

5. The method according to claim 4, wherein the determining the two-dimensional function $S_i(x,y)$ that corresponds to the i modulation matrix comprises:
   determining the two-dimensional functions $S_1(x,y)$, $S_2(x,y)$ and $S_3(x,y)$ that correspond to the modulation matrices $M_1$, $M_2$ and $M_3$, and separately meeting:

$S_1(x,y)=1$ $S_2(x,y)=x$ $S_3(x,y)=x^2$ an abscissa and an ordinate of a coordinate system where the two-dimensional functions $S_1(x,y), S_2(x,y)$ and $S_3(x,y)$ are located correspond to row directions and column directions of the modulation matrices $M_1$, $M_2$ and $M_3$, respectively:

the modulating the optical signal according to the two-dimensional function $S_i(x,y)$ to obtain the optical information intensity value $I_i$ corresponding to i, which is equivalent to the geometric moment value corresponding to i comprises:

the corresponding optical information intensity value $I_i$ that is acquired by modulating the optical signal based on the two-dimensional functions $S_1(x,y), S_2(x,y)$ and $S_3(x,y)$ is denoted as:

$I_i = \Sigma_{x,y} f(x,y) S_i(x,y);$ in the formula, i value is 1, 2, 3, and $f(x,y)$ is a two-dimensional distribution function of a target object image at the current focusing position; and the detected optical intensity values $I_1$, $I_2$ and $I_3$ are equivalent to geometric moment values $m_{00}$, $m_{10}$ and $m_{20}$, respectively.

6. A device for fast focusing by directly detecting target moments, comprising:

a modulation module configured to generate a setting modulation matrix and to receive an optical signal emitted or transmitted by a target object at different focusing positions, and the modulation matrix modulates the optical signal;

a geometric moment value acquisition module configured to acquire a geometric moment value of the target object at the different focusing positions according to the detected and modulated optical signal;

a central moment value acquisition module configured to receive the geometric moment value output by the geometric moment value acquisition module and to calculate a central moment corresponding to the target object at the different focusing positions; and a focusing position determination module configured to compare the central moment corresponding to the target object at all the focusing positions, and the focusing position that corresponds to the minimum central moment is determined as the focusing position.

7. The device according to claim 6, wherein the modulation module comprises a two-dimensional matrix generation unit and an optical modulator, the two-dimensional matrix generation unit generates a plurality of modulation matrices, and the optical modulator uses different modulation matrices sequentially and periodically to modulate the optical signal.

8. The device according to claim 7, wherein the optical modulator comprises a plurality of micro-mirrors presenting an array distribution, and each element value in the modulation matrices corresponds to an unique micro-mirror.

9. A non-transitory computer-readable storage medium, wherein the medium stores a computer program, and while the computer program runs, the method for fast focusing by directly detecting target moments according to claim 1 is implemented.

10. A computer device, comprising a processor and a storage medium, wherein the storage medium stores a computer program, and the processor reads and runs the computer program from the storage medium to execute the method for fast focusing by directly detecting target moments according to claim 1.

* * * * *